(12) United States Patent
Lindström et al.

(10) Patent No.: US 11,521,082 B2
(45) Date of Patent: Dec. 6, 2022

(54) PREDICTION OF A DATA PROTECTION ACTIVITY TIME FOR A BACKUP ENVIRONMENT

(71) Applicant: KYNDRYL, INC., New York, NY (US)

(72) Inventors: Mikael Lindström, Sollentuna (SE); Daniela Trevisan, Porto Alegre (BR); Alex R. Martin, Solihull (GB); Mu Qiao, Belmont, CA (US)

(73) Assignee: Kyndryl, Inc., New York, NY (US)

( * ) Notice: Subject to any disclaimer, the term of this patent is extended or adjusted under 35 U.S.C. 154(b) by 520 days.

(21) Appl. No.: 16/688,739

(22) Filed: Nov. 19, 2019

(65) Prior Publication Data

US 2021/0150383 A1   May 20, 2021

(51) Int. Cl.
*G06N 5/04* (2006.01)
*G06N 5/02* (2006.01)
*G06N 20/00* (2019.01)
*G06F 3/06* (2006.01)

(52) U.S. Cl.
CPC .............. *G06N 5/04* (2013.01); *G06F 3/065* (2013.01); *G06F 3/0619* (2013.01); *G06F 3/0673* (2013.01); *G06N 5/022* (2013.01); *G06N 20/00* (2019.01)

(58) Field of Classification Search
CPC .......... G06N 5/04; G06N 5/022; G06N 20/00; G06F 3/0619; G06F 3/065; G06F 3/0673; G06F 11/1448; G06F 11/1461; G06F 11/1469
See application file for complete search history.

(56) References Cited

U.S. PATENT DOCUMENTS

| | | | | |
|---|---|---|---|---|
| 9,430,335 | B2* | 8/2016 | Jin | G06F 11/1451 |
| 9,798,629 | B1* | 10/2017 | Shilane | G06F 11/1466 |
| 2017/0102998 | A1* | 4/2017 | Bavishi | G06F 11/1464 |
| 2019/0007278 | A1 | 1/2019 | Singh et al. | |
| 2020/0007620 | A1* | 1/2020 | Das | H04L 67/62 |

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

*Primary Examiner* — Jonathan Han
(74) *Attorney, Agent, or Firm* — Erik Swanson; Matthew M. Hulihan; Heslin Rothenberg Farley & Mesiti PC

(57) ABSTRACT

Data protection activity time in a backup environment can be predicted with a computer-implemented method. The method includes gathering datasets of data points from a range of backup components of a backup system and constructing input features for a predictive machine learning model, where the input features relate to backup parameters of the backup system. The method also includes training the predictive machine learning model to predict data protection activity times for the backup system by using the gathered datasets and applying the input features to the model. The method also includes deploying the trained predictive machine learning model to predict a data protection activity time of a backup system formed of a set of the backup components.

20 Claims, 6 Drawing Sheets

PREDICTION OF A DATA PROTECTION ACTIVITY TIME FOR A BACKUP ENVIRONMENT

BACKGROUND

The present disclosure relates to predicting a data protection activity time in a backup environment, and more specifically, to the prediction of a data protection activity time such as a recovery time or a backup time within a backup environment.

Backup and recovery environments can include several components such as backup servers, backup clients, a backup repository, and a network. All of these components can be designed and configured in several different ways on both hardware and software layers. This inherent complexity can make it difficult to evaluate the impact and dependencies of each of the components in the overall recovery performance. Estimating recovery times may not be a simple task.

The combination of exponential growth in data volume in conjunction with the increase of cyber-attack incidents can raise concerns regarding recovery times for larger data sets and mass recoveries. Even though backup and recovery solutions are designed to meet recovery time objectives as well as recovery point objectives, there are no known tools or methods to predict the recovery time for a specific server or environment.

SUMMARY

Embodiments can be directed towards a computer-implemented method for prediction of a data protection activity time in a backup environment. The method can include gathering datasets of data points from a range of backup components of a backup system and constructing input features for a predictive machine learning model, wherein the input features relate to backup parameters of the backup system. The method can also include training the predictive machine learning model to predict data protection activity times for the backup system by using the gathered datasets and applying the input features to the model. The method can also include deploying the trained predictive machine learning model to predict a data protection activity time of a backup system formed of a set of the backup components.

Embodiments can also be directed towards a system for prediction of a data protection activity time in a backup environment. The system can include a processor and a memory electrically connected and configured to provide computer program instructions to the processor to execute functions of the components. The system can also include a data gathering component configured to gather datasets of data points from a range of backup components of a backup system. The system can also include an input feature constructing component configured to construct input features for a predictive machine learning model, wherein the input features relate to backup parameters of the backup system. The system can also include a training component configured to train the predictive machine learning model to predict data protection activity times for the backup system by using the gathered datasets and applying the input features to the model. The system can also include a deploying component configured to deploy the trained predictive machine learning model to predict a data protection activity time of a backup system formed of a set of the backup components.

Embodiments can also be directed towards a computer program product for data protection activity time prediction in a backup environment. The computer program product includes a computer-readable storage medium having program instructions embodied therewith. The program instructions are executable by a processor to cause the processor to gather datasets of data points from a range of backup components of a backup system and construct input features for a predictive machine learning model wherein the input features relate to backup parameters of the backup system. The program instructions are also executable to cause the processor to train the predictive machine learning model to predict data protection activity times for the backup system by using the gathered datasets and applying the input features to the model. The program instructions are also executable to cause the processor to deploy the trained predictive machine learning model to predict a data protection activity time of a backup system formed of a set of the backup components.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
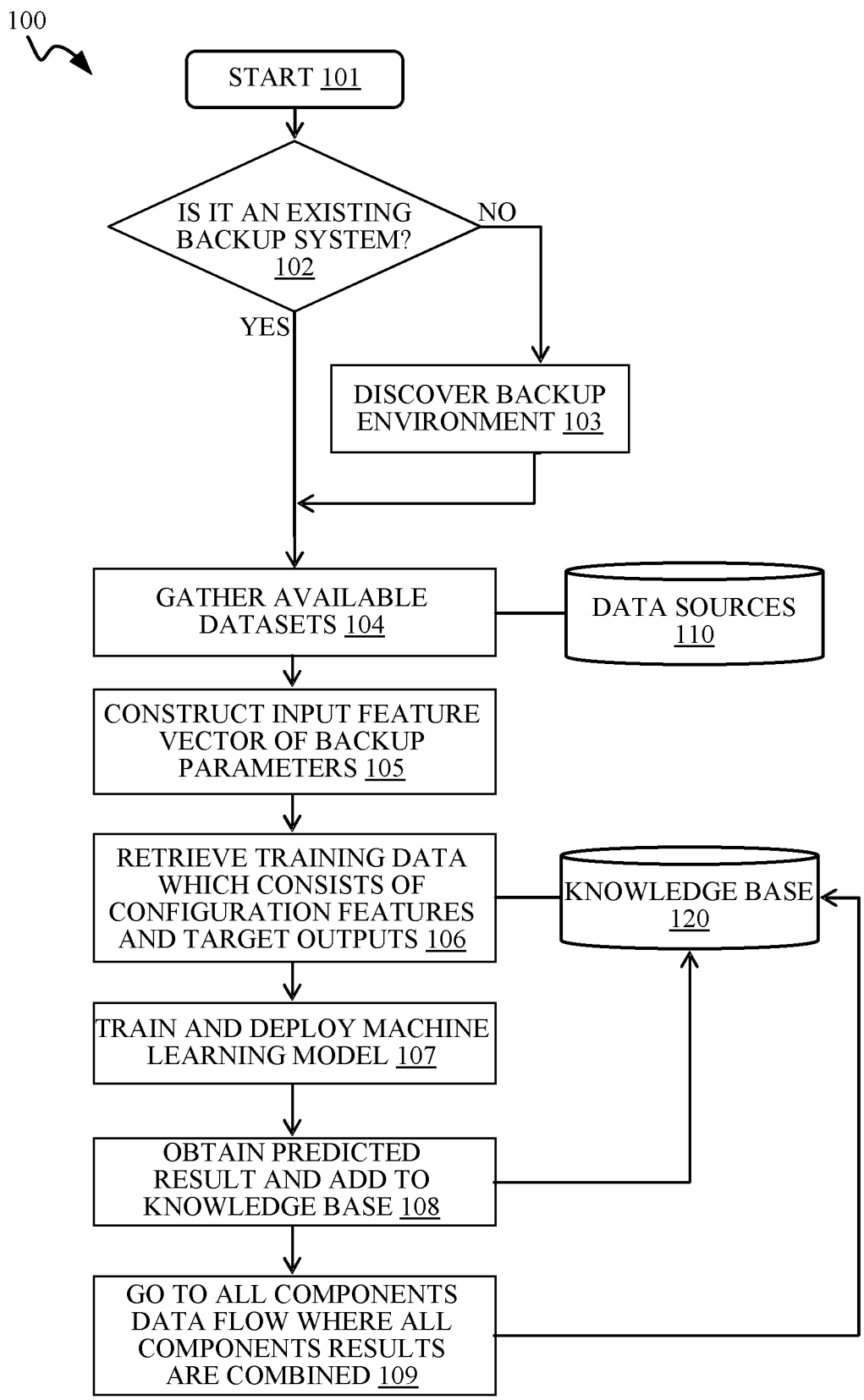
FIG. 1 is a flow diagram of an example method for prediction of a data protection activity time, according to embodiments of the present disclosure.

It will be appreciated that for simplicity and clarity of illustration, elements depicted in the figures have not necessarily been drawn to scale. For example, the dimensions of some of the elements can be exaggerated relative to other elements for clarity. Further, where considered appropriate, reference numbers can be repeated among the figures to indicate corresponding or analogous features.

While the disclosure is amenable to various modifications and alternative forms, specifics thereof have been depicted by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

In the drawings and the Detailed Description, like numbers generally refer to like components, parts, steps, and processes.

DETAILED DESCRIPTION

The proposed method and system can be used to discover data points that relate to data protection activities such as backup and/or recovery in a backup environment. The proposed method and system can also be used to format and combine the data points into a single machine learning model to train the machine learning to predict a data protection activity time in the backup environment. The activity time can be a restore time or a backup time which can be predicted for a specific restore or backup criteria.

The machine learning methods can train the system using collected data points and information available in a knowledge base based upon known environments. The data points can be formatted and combined into a single machine learning model used to train the system with methods such as regression and/or classification.

The method can be used to predict the activity time for a given system through predictive analytics refined using machine learning techniques. The predictive analytics can take into account the complex nature of the underlying data points requiring in-depth subject matter expertise to identify relevant attributes and cover diverse system configurations.

The method can also be used to determine accurate recovery times or backup times for a system where the system includes a range of backup environment components including: backup server software, backup servers operating system, networking and storage being used by the backup servers/clients. Data is gathered from a range of backup environments and can be used for training a predictive model of recovery times, by applying backup parameters to the model using machine learning.

Referring to FIG. 1, flow diagram 100 depicts the described method for predicting an activity time for a system. The method is described in the context of predicting recovery times for the backup environments. However, the method can also be used for predicting backup times for the backup environments or other data protection activities. Some modifications to the method may be required to focus on backup features in place of recovery features.

The method starts at block 101 and can gather, in operation 104, available datasets at data points from the data protection architecture. This can gather data of datasets at data points from data sources, in operation 110, of a range of components of the backup environments of the system.

In order to gather datasets, the method can determine, in operation 102, if this is an existing backup system and, if it is not an existing backup system, can perform a backup environment discovery, in operation 103, to understand the architecture and topology. The discovery of operation 103 can include interrogating of the following aspects:

Is it a dedicated backup network?

Is there an EtherChannel configured for fault-tolerant high-speed links?

How many adapters are a part of the EtherChannel/backup network?

What is/are the Ethernet adapter speeds?

What are the data sources where data points are going to be gathered from?

Gathering datasets, in operation 104, of data points gathers data from data sources 110 of a range of discovered components of the backup environments of the system. The data points can be split by components including for example, a server configuration, a backup server, a backup source, a restore target and a client server. Data points of interest can be identified based on subject matter expertise in the area. This identification can enable a vast number of possible datasets to be quickly narrowed to the relevant attributes for the described model. There can be cases where not all the information on data points will be available to be gathered, however, the described approach can allow the method to identify the unknowns and increase the data collection capability going forwards. Data points can differ for different data protection activities such as recovery versus backup. For example, recovery can include data points from restore targets.

An input feature vector can be constructed, in operation 105, as a shortlist of attributes in the form of backup parameters on which the prediction of recovery time is to be based. The input feature vector can define the measurable properties or characteristics of the recovery. Choosing the features can be required to provide effective algorithms in machine learning to facilitate the learning process. Features and values that can be used for the feature vector can include, for example, memory and amount of memory, whether deduplication is enabled or not enabled, storage type, make/model and whether encryption is enabled or not enabled. Similar input feature vectors can be used for different data protection activities such as recovery and backup, however, different configurations can be accommodated.

The method can retrieve, in operation 106, training data consisting of configuration features and target outputs. The target output would be the recovery time, or other data protection activity time, such as backup time, of systems with similar sets of features. The method uses a knowledge base 120 source of data to train a machine learning model.

A knowledge base 120 can be generated based on a training set used to train the model. As an initial source of knowledge base 120, an established data ocean can be used. Although not all attributes may be present, this provides a solid base of training data to work. The knowledge base continues to be expanded during use of the model.

The machine learning model can be trained and deployed in operation 107. This is described further with reference to FIG. 2 below. Using the machine learning methods, the backup and recovery times can thus be predicted. The possible machine learning methods to use can be roughly divided into two categories: regression and classification. The choice of regression and regression can depend on specific use cases.

The method can obtain, in operation 108, the prediction results, and can add to the knowledge base where all historic information is stored for future iterations.

The method can progress to operation 109, to all components data flow where all components' results are combined.

Figure 2:
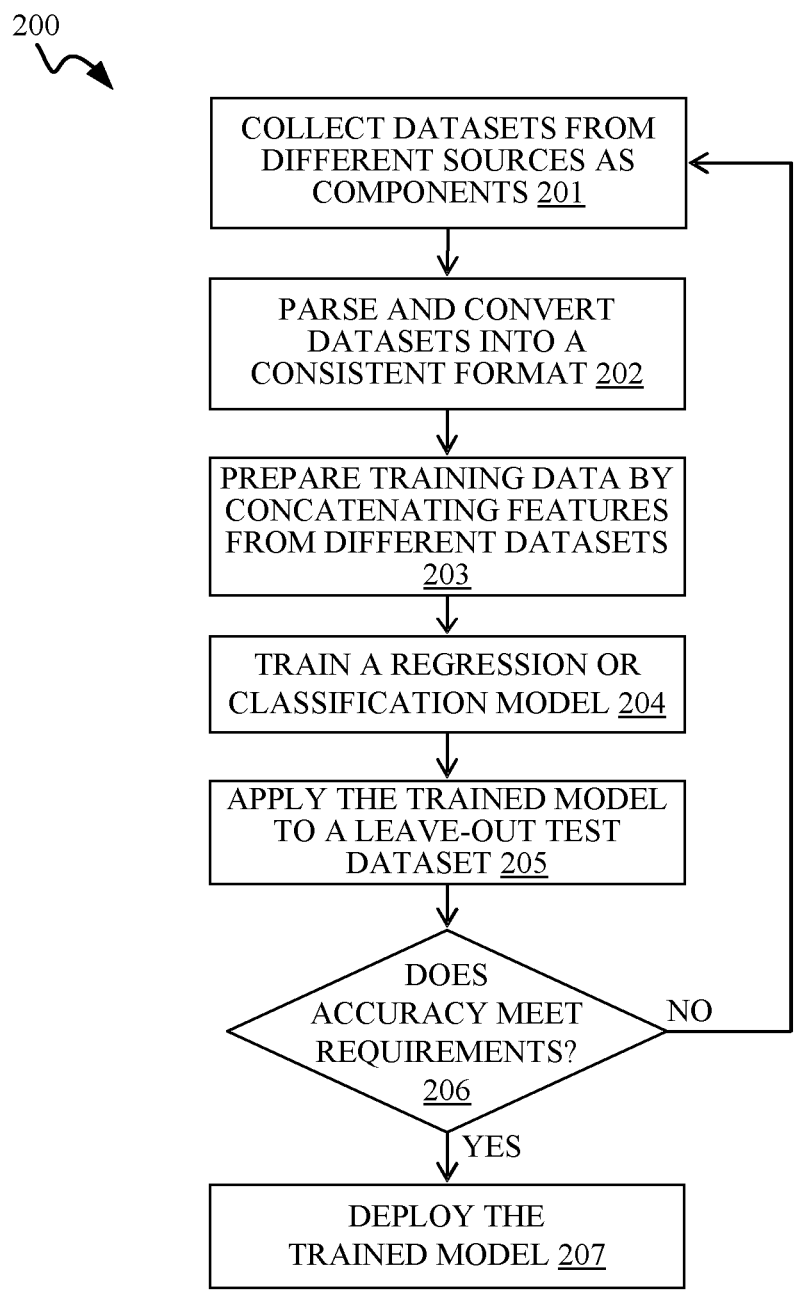
FIG. 2 is a flow diagram of an aspect of a method for data protection activity time prediction, according to embodiments consistent with the figures.

Referring to FIG. 2, a flow diagram 200 depicts an embodiment of the iterative development cycle of the machine learning model. Each data collection can ultimately provide an opportunity to refine the predictive model and thus create further test data with a same set of feature definitions as the training data.

The method collects, in operation 201, datasets, which requires data capture from the backup components such as the backup server software, the backup server's operating system, and the storage being used by the backup server. This alone is a non-trivial task with a wide variation of vendors and within each vendor specific software/hardware releases.

The data is parsed and converted, in operation 202, to convert the collected data initially directly into an intermediary data format such as JavaScript Object Notation (JSON) (JavaScript is a trademark of Oracle America, Inc.), Comma-Separated Values (CSV) or Extensible Markup Language (XML), before normalizing the data into a cross-vendor format. The intermediary step allows for new normalized forms to be created retroactively as the model and the understanding improves.

Training data is prepared, in operation 203, by converting the normalized data into a format appropriate for machine learning, for example, a CSV file, where each row represents a recovery data instance in the form of features as well as the corresponding recovery time. Features from different datasets can be concatenated.

A machine learning model is trained, in operation 204, using the prepared training data. According to embodiments, this can include training a regression and/or a classification model.

The model is tested by applying, in operation 205, the trained model to a separate leave-out test data set to obtain the required prediction accuracy. A leave-out test data set is separate from the training data set. It can be determined, in operation 206, if the accuracy meets the user requirements. If so, the method can move on to a deployment cycle in operation 207. Otherwise, the method can iterate to collect, in operation 201, datasets and repeat the method to improve the accuracy. Once the required accuracy is achieved, the trained model is deployed in operation 207.

Many machine learning methods can be applied to predict data protection activity times such as a recovery time and a backup time. They can be roughly divided into two categories: regression and classification.

In regression, the model input is the features or variables, such as the data points, and the output is the estimated recovery time or backup time in numerical values. Popular regression methods can be applied to do the prediction, such as logistic regression, random forest, eXtreme Gradient Boosting (XGBoost), and deep neural network-based methods. In regression methods, the output is the estimated exact recovery time or backup time.

In contrast to regression, in classification-based prediction methods, classes are defined. Specifically, the recovery time or backup time is divided into several classes, for example, 0-1 hour, 1-5 hours, 5-24 hours, and above 24 hours. The model output is the predicted class, instead of exact numerical values. Many popular classification methods can be applied to do the classification, such as support vector machines (SVM), logistic regression, random forest, and deep neural network-based methods.

The method can be selected with the best prediction results. The choice of regression and classification can depend on particular specific use cases. For example, if the user would like to know the exact recovery time or exact backup time, a regression model can be trained. Classification provides a rough estimation of the recovery time or backup time. In practice, more training data may be required in regression than in classification.

In order to predict the recovery time, the method extracts features related to the recovery time and constructs the feature vector. These features can come from the aforementioned components, such as server configuration, backup server, backup source, restore target and client server. The server components (backup server and client server) can have features related with computing, such as a central processor unit (CPU), a random access memory (RAM), or features related with storage, such as direct-attached storage (DAS), storage area networks (SAN), local area networks (LAN), and throughput. The backup source component can include features related with disk, such as whether the disk is deduplicated, compressed, or encrypted, and the throughput of the disk.

Similarly, the method extracts features from the software configuration component as well as the restore target component. These features are concatenated into a single feature vector.

In order to predict the backup time, the method can extract features related to backup time and construct the feature vector. This can differ from the feature vector for the recovery time as it may not include data points at the restore components.

Further feature selection can be performed to select the most informative features with respect to the final predictions. Feature selection can help identify the most significant features and improve the prediction accuracy. For example, it can be found that the feature "network throughput of backup server" is significant, with respect to the prediction time. After training the prediction model, users can be informed of how much the prediction time will change when the network throughput can be adjusted. This can help users identify potential bottlenecks or critical configurations to adjust, in order to reduce the overall prediction time and meet Service Level Agreements.

This method can determine at the time of backup what the potential recovery time will be based on the backup mechanism chosen, for example, file backup, snapshot, etc., so clients can segment their backups accordingly, for example, where business application is favored in a mass recovery situation.

The method can also determine at backup and restore time, even outside a recovery window, the estimated time for various recovery scenarios. Different recovery scenarios can include: a set of files, a whole drive, for example, Windows D: drive, and a whole server/application database from system outage to login to the recovered application.

The method can also determine a predicted backup time based on the backup mechanism chosen.

The results can be delivered in exact time values or defined time ranges, for example, 0-1 hour, 1-5 hours, 5-24 hours, and above 24 hours. The method can also validate if the Service Level Agreement (SLA) or Recovery Time Objective are met.

Example Features Extracted from a Backup Environment:

Shared physical resources:

Including: computing (virtual) resources, network resources, storage resources, and process resources.

Transfer rates between components:

Component transfer rates-throughput that can be achieved with a given configuration/architecture. For example, the transfer rate that can be reached from server A to server B over the network.

Backup Server Configuration

Disk:

| | |
|---|---|
| Duplicated | Inline/Post |
| Compressed | Enabled |
| Encrypted | Enabled |

Tape:

| | |
|---|---|
| Collocation | Enabled |

Other:

| | |
|---|---|
| Meta/Control Files | VMware Control |
| Replicated | Local Recovery/Remote |

Backup Server

Compute:

| | |
|---|---|
| CPU | Sockets |
| | Cores |
| | Speed |
| RAM | Capacity |

Storage:

| | |
|---|---|
| DAS | SCSI (Small Computer System Interface) |
| | SATA (Serial Advanced Technology Attachment) |
| | SAS (Serial Attached SCSI)F |
| LAN | iSCSI (Internet SCSI) |
| | FCoE (Fibre Channel over Ethernet) |
| SAN | FC (Fibre Channel) |
| | iSCSI |
| Throughput | Write Speed |
| | Read Speed |

Networking:

| | |
|---|---|
| LAN | Adapter Speeds |
| SAN | Adapter Speeds |
| Throughput | Transfer rate |
| | Max bandwidth |

Backup Source

Disk:

| | |
|---|---|
| Deduplicated | Hardware/Software |
| Compressed | Hardware/Software |
| Encrypted | Hardware/Software |
| Throughput | Read speed |

Tape:

| | |
|---|---|
| Throughput | Read Speed |

Networking:

| | |
|---|---|
| LAN | Adapter Speeds |
| SAN | Adapter Speeds |
| Throughput | Transfer rate |
| | Max bandwidth |

Restore Target

Disk:

| | |
|---|---|
| Deduplicated | Hardware/Software |
| Compressed | Hardware/Software |
| Encrypted | Hardware/Software |
| Throughput | Read speed |

Tape:

| | |
|---|---|
| Throughput | Read Speed |

Networking:

| | |
|---|---|
| LAN | Adapter Speeds |
| SAN | Adapter Speeds |
| Throughput | Transfer rate |
| | Max bandwidth |

Client Server

Compute:

| | |
|---|---|
| CPU | Sockets |
| | Cores |
| | Speed |
| RAM | Capacity |

Storage:

| | |
|---|---|
| DAS | SCSI |
| | SATA |
| | SAS |
| LAN | iSCSI |
| | FCoE |
| SAN | FC |
| | iSCSI |
| Throughput | Write Speed |
| | Read Speed |

Networking:

| | |
|---|---|
| LAN | Adapter Speeds |
| SAN | Adapter Speeds |
| Throughput | Transfer rate |
| | Max bandwidth |

TABLE 1

Exemplary features and values.

| Feature | Value |
| --- | --- |
| Server type | IBM Power System S922 |
| Memory | 384 GB |
| CPU | 20 processor cores, 2.9 GHz or faster |
| Ethernet | 2 × 10 Gb Ethernet |
| Server Internal disk | 300 GB 15K RPM SAS |
| Storage type | V5030 |
| Redundant Array of Inexpensive Disks (RAID) configuration | DRAID6 on all disks |
| Storage Pool: stgpool (where the backup data is stored) | 8 TB NL-SAS drives |
| Storage Pool: stgpool Deduplication | Enabled |
| Storage Pool: stgpool Compression | Enabled |
| Storage Encryption | Enabled |
| Storage Pool: database | 1.9 TB SSD |
| Storage Pool active log | 1.9 TB SSD |
| Storage Pool server-Host Bus Adapters | 4 × 16 Gb Fibre Channel adapter |
| Restore_data_size | 1,886 GB |
| Restore_process_num | 4 |
| Throughput of restore session | 8 GB per hour |

Figure 3:
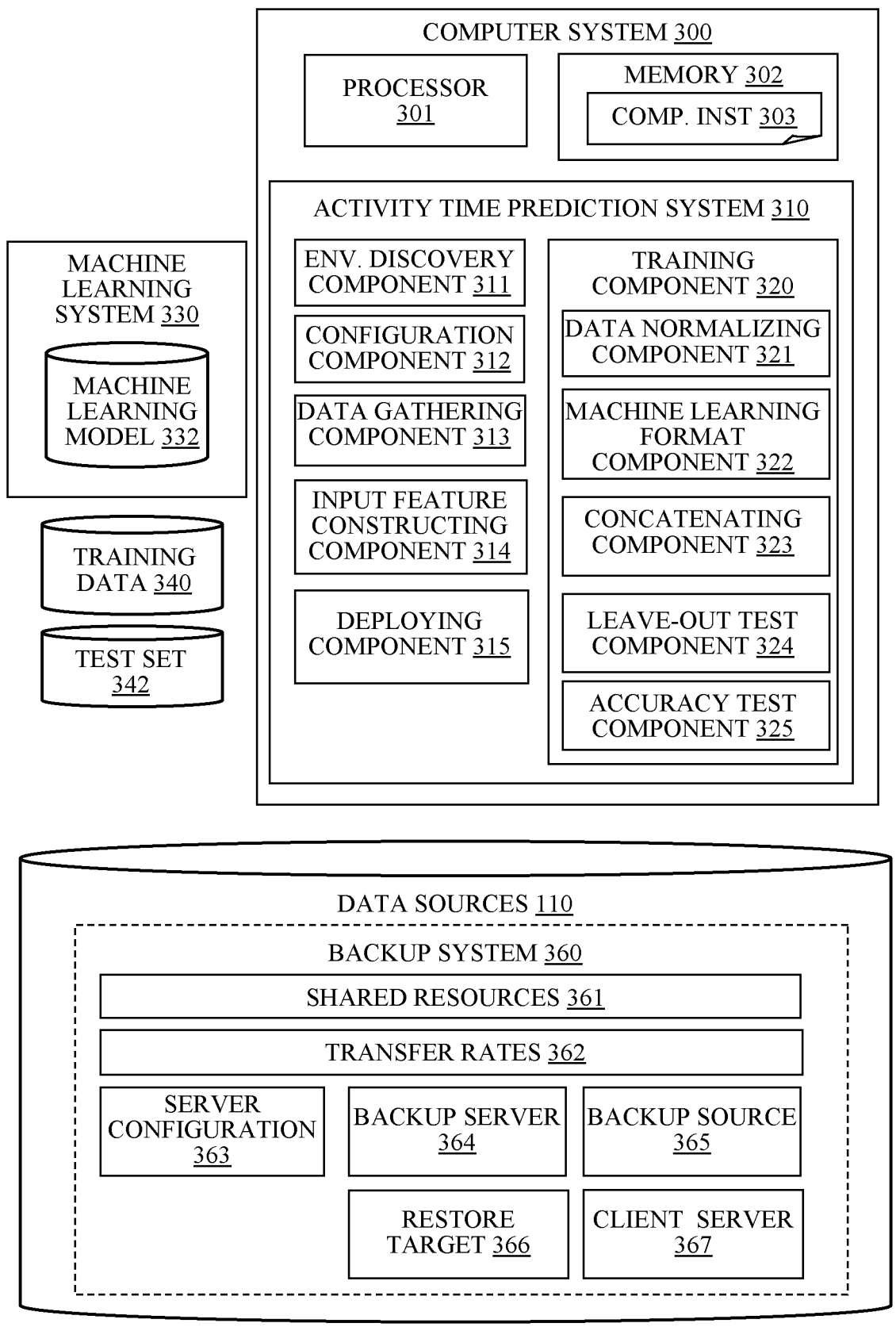
FIG. 3 is block diagram of a system for prediction of a data protection activity time, according to embodiments consistent with the figures.

Referring to FIG. 3, a block diagram depicts an example system in the form of a computer system 300 including an activity time prediction system 310 for predicting a data protection activity time such as a recovery time or a backup time.

The computer system 300 can include at least one processor 301, a hardware module, or a circuit for executing the functions of the described components which can be software units executing on the at least one processor. Multiple processors running parallel processing threads can be provided enabling parallel processing of some or all of the functions of the components. Memory 302 can be configured to provide computer instructions 303 to the at least one processor 301 to carry out the functionality of the components.

The activity time prediction system 310 is used to predict data protection activity times of a backup system 360 including components from which datasets of data points can be gathered. In this way the components of the backup system 360 provide data sources 110 for the prediction system 310. The components of the backup system 360 can include shared resources 361, transfer rates 362, server configurations 363, backup servers 364, backup sources 365, restore targets 366, and client servers 367.

The activity time prediction system 310 can include a machine learning system 330 for training and deploying a machine learning model 332 to provide the predictions. The machine learning system 310 can use training data 340 and test data 342 in its training.

The activity time prediction system 310 can include a backup environment discovery component 311 for discovering components of a new backup system or referencing known backup arrangements.

The activity time prediction system 310 can include a data gathering component 313 for gathering datasets of data points from a range of backup components of the backup system 360 and an input feature constructing component 314 for constructing input features for a predictive machine learning model, where the input features relate to backup parameters of the backup system.

The activity time prediction system 310 can include a training component 320 for training the predictive machine learning model 332 to predict data protection activity times for the backup system using the gathered datasets and applying the input features to the model. The training component 320 can include: a data normalizing component 321, a machine learning format component 322, a concatenating component 323, a leave out test component 324, and an accuracy test component 325 to provide the training functionality described above.

The activity time prediction system 310 can include a deploying component 315 for deploying the trained predictive machine learning model to predict a data protection activity time of a backup system formed of a set of the backup components.

The activity time prediction system 310 can include a configuration component 312 for selecting the input features as significant features that improve prediction accuracy and selecting data points to narrow data to be gathered to relevant attributes.

Figure 4:
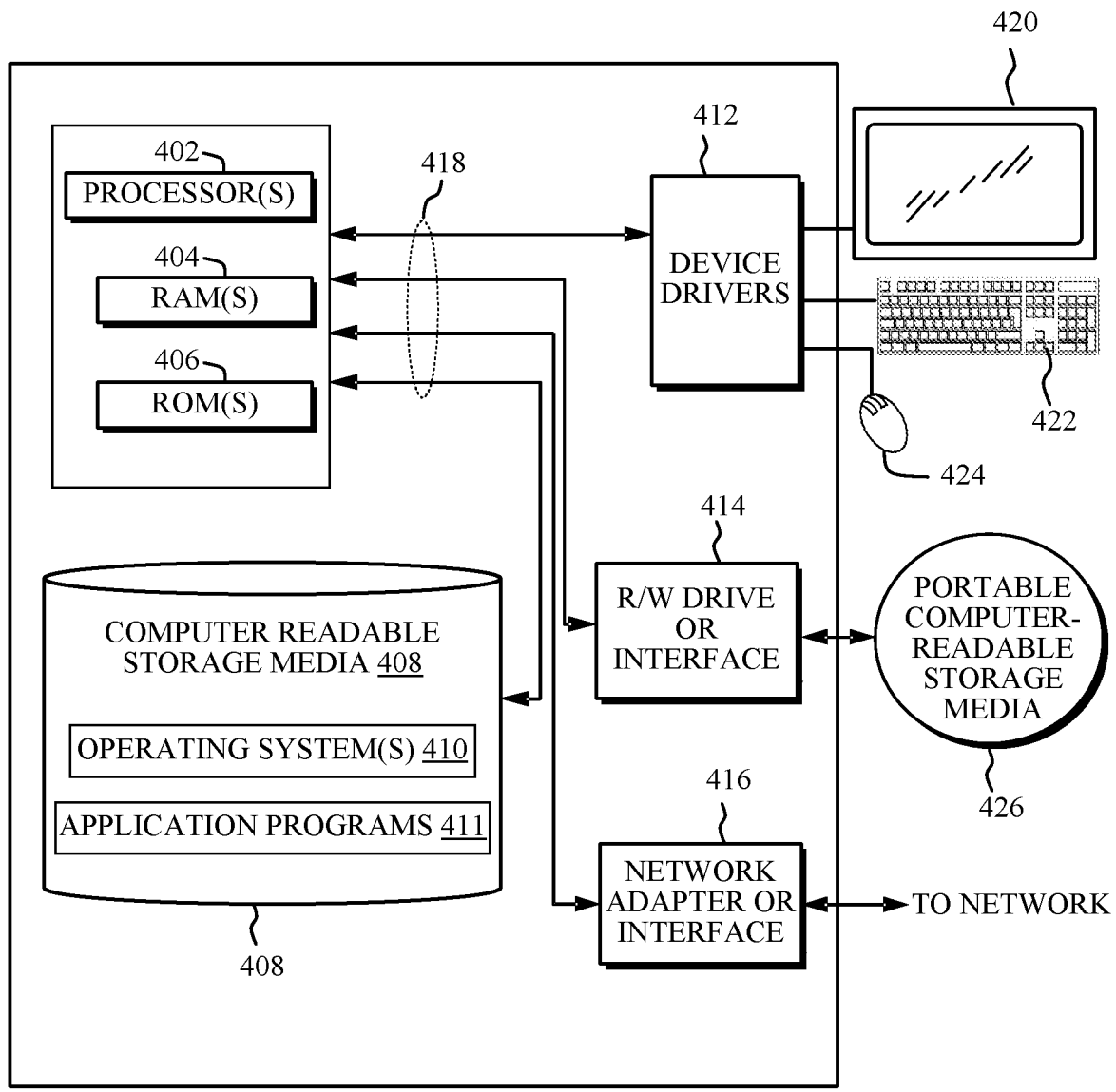
FIG. 4 is a block diagram of a computer system or cloud server in which the present disclosure can be implemented, according to embodiments consistent with the figures.

FIG. 4 depicts a block diagram of components of the computer system 300 of FIG. 3, in accordance with embodiments of the present disclosure. It can be appreciated that FIG. 4 provides only an illustration of one implementation and does not imply any limitations with regard to the environments in which different embodiments can be implemented. Many modifications to the depicted environment can be made.

Computer system 300 can include one or more processors 402, one or more computer-readable RAMs 404, one or more computer-readable ROMs 406, one or more computer-readable storage media 408, device drivers 412, read/write drive or interface 414, and network adapter or interface 416, all interconnected over a communications fabric 418. Communications fabric 418 can be implemented with any architecture designed for passing data and/or control information between processors such as microprocessors, communications and network processors, etc., system memory, peripheral devices, and any other hardware components within the system.

One or more operating systems 410, and application programs 411, such as the recovery time prediction system 310 are stored on one or more of the computer-readable storage media 408 for execution by one or more of the processors 402 via one or more of the respective RAMs 404, which typically include cache memory. In the illustrated embodiment, each of the computer-readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer-readable storage media that can store a computer program and digital information, in accordance with embodiments of the disclosure.

Computer system 300 can also include a R/W drive or interface 414 to read from and write to one or more portable computer-readable storage media 426. Application programs 411 on computer system 300 can be stored on one or more of the portable computer-readable storage media 426, read via the respective R/W drive or interface 414 and loaded into the respective computer-readable storage media 408.

Computer system 300 can also include a network adapter or interface 416, such as a Transmission Control Protocol/Internet Protocol (TCP/IP) adapter card or wireless communication adapter. Application programs 411 on computer system 300 can be downloaded to the computing device from an external computer or external storage device via a network, for example, the Internet, a local area network or other wide area networks or wireless networks, and network adapter or interface 416. From the network adapter or interface 416, the programs can be loaded into the computer-readable storage media 408. The network can include copper wires, optical fibers, wireless transmission, routers, firewalls, switches, gateway computers and edge servers.

Computer system 300 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can include hardware and software stored in computer-readable storage media 408 and/or ROM 406.

The present disclosure can be a system, a method, and/or a computer program product at any possible technical detail level of integration. The computer program product can include a computer-readable storage medium, or media, having computer-readable program instructions thereon for causing a processor to carry out aspects of the present disclosure.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks depicted in succession can, in fact, be accomplished as one step, executed concurrently, substantially concurrently, in a partially or wholly temporally overlapping manner, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms, e.g., mobile phones, laptops, and personal digital assistants (PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
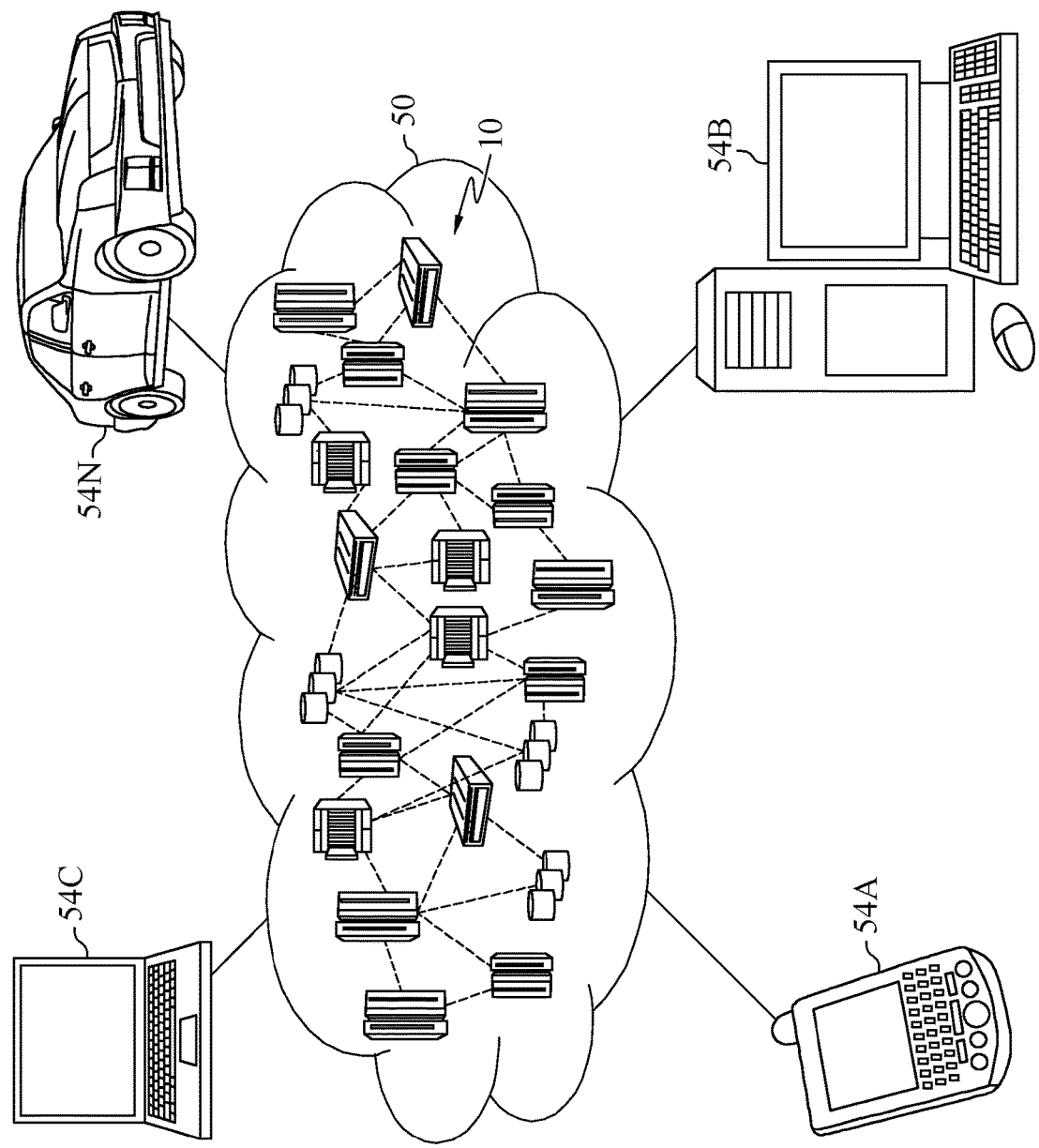
FIG. 5 is a schematic diagram of a cloud computing environment in which the present disclosure can be implemented, according to embodiments consistent with the figures.

Referring now to FIG. 5, illustrative cloud computing environment 50 is depicted. As depicted, cloud computing environment 50 includes one or more cloud computing nodes 10 with which local computing devices used by cloud consumers, such as, for example, a PDA or cellular telephone 54A, desktop computer 54B, laptop computer 54C, and/or automobile computer system 54N may communicate. Nodes 10 may communicate with one another. They may be grouped (not depicted) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted in FIG. 5 are intended to be illustrative only and that computing nodes 10 and cloud computing environment 50 can communicate with any type of computerized device over any type of network and/or network addressable connection (e.g., using a web browser).

Figure 6:
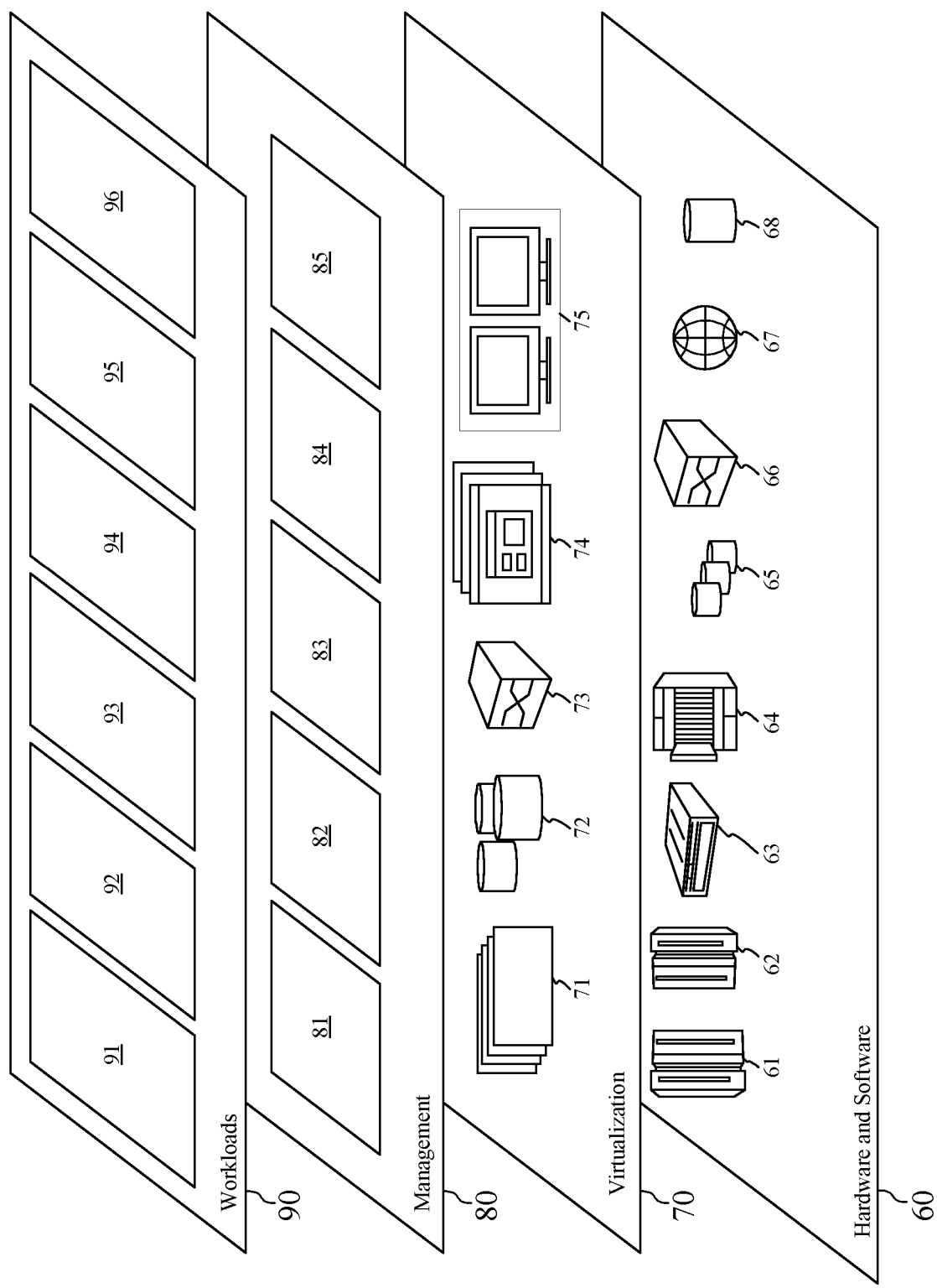
FIG. 6 is a diagram of abstraction model layers of a cloud computing environment in which the present disclosure can be implemented, according to embodiments consistent with the figures.

Referring now to FIG. 6, a set of functional abstraction layers provided by cloud computing environment 50 (FIG. 5) is depicted. It should be understood in advance that the components, layers, and functions depicted in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and data protection activity prediction processing 96 including machine learning processing.

A computer program product of the present disclosure includes one or more computer-readable hardware storage devices having computer-readable program code stored therein, the program code executable by one or more processors to implement the methods of the present disclosure.

A computer system of the present disclosure includes one or more processors, one or more memories, and one or more computer-readable hardware storage devices, the one or more hardware storage device containing program code executable by the one or more processors via the one or more memories to implement the methods of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

What is claimed is:

1. A computer-implemented method for prediction of a data protection activity duration of time in a backup environment, the method comprising:
    gathering datasets of data points from a range of backup components of a backup system;
    constructing input features for a predictive machine learning model, wherein the input features relate to backup parameters of the backup system;
    training the predictive machine learning model to predict data protection activity duration of times for the backup system by using the datasets and applying the input features to the model; and
    deploying the predictive machine learning model to predict a data protection activity duration of time of a backup system formed of a set of the backup components.

2. The method of claim 1, wherein the data protection activity duration of time is selected from the group consisting of: a duration of time to perform a recovery, and a duration of time to perform a backup for at least one selected respective recovery/backup scenario.

3. The method of claim 2, wherein training the predictive machine learning model includes:
    providing a machine learning format in which each row represents a recovery data instance in the form of features and a corresponding recovery duration of time.

4. The method of claim 2, wherein training the predictive machine learning model includes:
    providing a machine learning format in which each row represents a backup data instance in the form of features and a corresponding backup duration of time.

5. The method of claim 1, further comprising selecting the input features as significant features that improve prediction accuracy.

6. The method of claim 1, further comprising selecting data points to narrow data to be gathered to relevant attributes.

7. The method of claim 1, wherein training the predictive machine learning model includes:
    parsing and converting gathered datasets into a normalized form that allows additional normalized forms to be created retroactively for the model.

8. The method of claim 1, wherein training the predictive machine learning model includes:
    preparing training data by concatenating features from different datasets and training a machine model using machine learning formatted data.

9. The method of claim 1, wherein training the predictive machine learning model includes:
    applying a trained predictive machine learning model to a leave-out test dataset to determine a required accuracy.

10. The method of claim 1, wherein training the predictive machine learning model uses a knowledge base of training data and wherein the method includes adding to the knowledge base results of deployment of a trained predictive machine learning model.

11. The method of claim 1, wherein the method is used to determine, at a time of backup, a predicted potential duration of time to perform a recover, based on a chosen backup mechanism.

12. The method of claim 1, wherein the method is used to determine, at a backup and restore time, an estimated time for different recovery scenarios.

13. The method of claim 1, wherein datasets of data points are gathered from the group consisting of: a server configuration, a backup server, a backup source, a restore target, a client server, shared resources of the backup components and transfer rates of the backup components.

14. A system for prediction of a data protection activity duration of time in a backup environment, the system comprising:
a processor and a memory electrically connected and configured to provide computer program instructions to the processor to execute functions of components:
a data gathering component configured to gather datasets of data points from a range of backup components of a backup system;
an input feature constructing component configured to construct input features for a predictive machine learning model, wherein the input features relate to backup parameters of the backup system;
a training component configured to train the predictive machine learning model to predict data protection activity duration of times for the backup system by using the datasets and applying the input features to the model; and
a deploying component configured to deploy the predictive machine learning model to predict a data protection activity duration of time of a backup system formed of a set of the backup components.

15. The system of claim 14, further comprising a configuration component configured to select particular input features as significant features that improve prediction accuracy and further configured to select data points to narrow data to be gathered to relevant attributes.

16. The system of claim 14, wherein the training component includes:
a data normalizing component configured to parse and convert gathered datasets into a normalized form that allows additional normalized forms to be created retroactively for the model.

17. The system of claim 14, wherein the training component includes:
a machine learning format component configured to provide a machine learning format including a plurality of rows each representing a data instance in the form of features and a corresponding activity duration of time.

18. The system of claim 14, wherein the training component uses training data and wherein the system updates the training data with results of deployment of the predictive machine learning model.

19. The system of claim 14, wherein the data gathering component gathers data from a source selected from the group consisting of: a server configuration, a backup server, a backup source, a restore target, a client server, shared resources of the backup components, and transfer rates of the backup components.

20. A computer program product for data protection activity duration of time prediction in a backup environment, the computer program product comprising a computer-readable storage medium having program instructions embodied therewith, the program instructions executable by a processor to cause the processor to:
gather datasets of data points from a range of backup components of a backup system;
construct input features for a predictive machine learning model wherein the input features relate to backup parameters of the backup system;
train the predictive machine learning model to predict data protection activity duration of times for the backup system by using gathered datasets and applying the input features to the model; and
deploy the predictive machine learning model to predict a data protection activity duration of time of a backup system formed of a set of the backup components.

* * * * *